D. W. BAILEY.
Concrete Pavement.

No. 9,207. Reissued May 18, 1880.

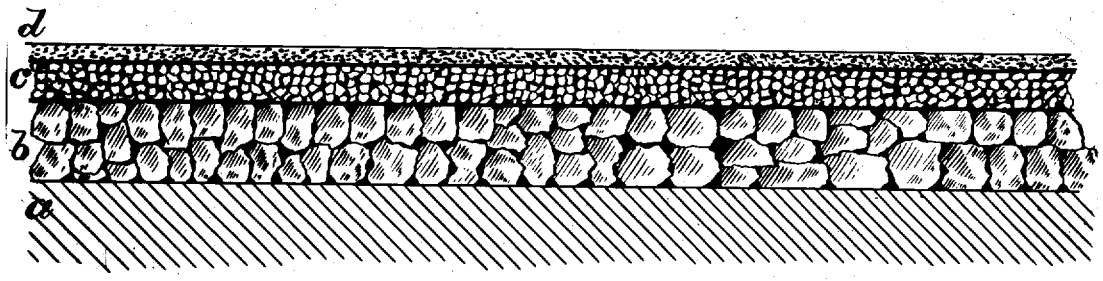

9,207. CONCRETE PAVEMENT. DAVIS W. BAILEY, Chel... Mass. Original No. 97,149, dated Nov. 23, 1869. Filed Apr. 30, 1879.

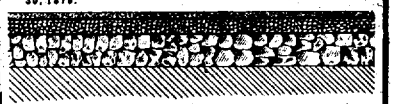

*Claim.*—1. In a concrete pavement, as a cement or binder for a foundation layer of broken stone, a compound consisting of asphaltum and dead or heavy oil, combined with ground slate, soap-stone, pulverized clay, or other analogous mineral substance, substantially as set forth.

2. In a concrete pavement, as a cement or binder for an intermediate layer of broken stone, a compound composed of coal-tar, asphalt, and oil of pitch, substantially such as described, when applied in the manner described and for the purposes set forth.

3. In a concrete pavement, a wearing or surface layer composed of a compound of coal-tar, pine-tar, asphalt, and oil of pitch, combined with gravel, sand, and coal-ashes, substantially as set forth.

4. In a concrete pavement, a surface or wearing... stantially such as described, having combined an... it a mixture of fine sand, slaked lime, and ground ... the surface of the pavement is caused to harden ... tially as set forth.

5. In a street pavement or roadway consisting of a... coarse broken stone cemented together in the manner a... means described, an intermediate layer of smaller ston... in the manner and by the means set forth, and a surface or w... ing course having incorporated therein the drying or harden... material, when constructed and combined in the manner ... for WITNESSES
E. H. Bates
J. C. Lattop D. W. Bailey.
INVENTOR Geo. Barrett.
ATTORNEY

UNITED STATES PATENT OFFICE.

DAVIS W. BAILEY, OF CHELSEA, MASSACHUSETTS.

CONCRETE PAVEMENT.

SPECIFICATION forming part of Reissued Letters Patent No. 9,207, dated May 18, 1880.

Original No. 97,149, dated November 23, 1869. Application for reissue filed April 30, 1879.

*To all whom it may concern:*

Be it known that I, D. W. BAILEY, of Chelsea, in the county of Suffolk and State of Massachusetts, have made an invention of a new and useful Process of Laying Composite or Concrete Pavements for Streets, &c.; and I do hereby declare the following to be a full, clear, and exact description of the same, and sufficiently in detail to enable others skilled in the art to which such invention appertains to practice it.

The process herein referred to, and which constitutes the subject-matter of these Letters Patent, and consequently of my invention, is an improved mode of laying street-pavements, and relates to means whereby a permanent, smooth, and very economical roadway is obtained at reasonable cost, a distinguishing feature in the invention being such a combination of ingredients or materials that the surface of the pavement hardens almost instantly, thus doing away with one great and present objection in large and crowded thoroughfares to the adoption of concrete or composite pavements, which consists in the fact that a considerable period of time, frequently amounting to weeks, must elapse after laying of the pavement before travel can be resumed over it.

The process I have adopted in laying a composite pavement consists, then, as follows: The substratum or foundation of earth is first brought to the requisite grade in any well-known manner. A quantity of asphaltum, either in a natural state or as prepared by a process peculiar to myself, is softened and diluted with dead-oil or heavy oil resulting from distillation or production of tar, the dead-oil serving as a vehicle whereby the asphaltum may be intimately mixed with ingredients which are incorporated into or with it. With such asphaltum I then incorporate, in varying quantities and proportions, according to season, climate, and circumstances, a quantity of ground slate, soap-stone, pulverized dry clay, or other finely-powdered analogous mineral or earthy substances, there being combined with such substances, when laid, a quantity of shells, stone, or other hard and desirable materials, the dead-oil having the valuable effect of retaining the asphaltum in a tenacious and semi-elastic state, but for which it would assume, when cold, a very hard and brittle one, while the earthy or mineral substances impart body to the mass and prevent liquefaction and escape of the asphaltum.

In laying a pavement as contemplated by my invention I dispose upon the foundation or graded substratum of the roadway a layer of stones to the depth of about one foot, varying with circumstances and requirements of travel, such stones varying in size from two to ten inches in diameter. The mixture or combination of materials above named is then heated until the mass assumes a liquid state, when a quantity is poured over the stones and allowed to settle itself over and about them, such liquid, when cold, serving to cement or connect such stones in an adhesive mass, by this means producing a solid and durable foundation for the succeeding deposits, to be explained. Upon this foundation thus acquired I deposit a second stratum, about two and one-half inches thick, of stones of a more uniform size, and of from one-half to two and one-half inches in diameter, subsequently pouring upon them a quantity of a heated mixture composed of coal-tar, asphalt, and oil of pitch, the latter of which is a refuse residuum in the production of resin. Upon this last-mentioned deposit of stones, smeared and cemented together as explained, I dump and distribute a layer, about one and one-half inches deep, of concrete composed of fine gravel, coarse sand, and sifted coal-ashes, mixed with a composition of asphalt, coal-tar, and oil of pitch, the purpose of combining this pitch with the mass being to deodorize it to a great extent, or to disguise the odors of the asphalt, thus doing away with (to many) a great objection to the use of asphalt in pavements, crude resin, naphtha, or other spirits being employed to temper or dilute the composition.

After having solidified and condensed into a smooth surface the two stratums of stones and composition by the employment of a heavy roller, I apply to such surface a combination of dry fine sand, slaked lime, and ground marble, such materials being incorporated with the substratum below it and forming therewith a hard wearing-face.

The purpose in adding the lime, as above explained, is to cause the surface of the pavement to harden at once, thus securing beneficial results, as hereinbefore premised, while the object sought in adding the ground marble is to impart to the pavement an appearance of being composed of granite or other light-colored stone. In this last respect my pavement is distinguished from others of its class, which are of a dark color.

Having thus fully described my invention, what I claim, and desire to secure by Letters Patent of the United States, is—

1. In a concrete pavement, as a cement or binder for a foundation layer of broken stone, a compound consisting of asphaltum and dead or heavy oil, combined with ground slate, soapstone, pulverized clay, or other analogous mineral substance, substantially as set forth.

2. In a concrete pavement, as a cement or binder for an intermediate layer of broken stone, a compound composed of coal-tar, asphalt, and oil of pitch, substantially such as described, when applied in the manner described and for the purposes set forth.

3. In a concrete pavement, a wearing or surface layer composed of a compound of coal-tar, pine-tar, asphalt, and oil of pitch, combined with gravel, sand, and coal-ashes, substantially as set forth.

4. In a concrete pavement, a surface or wearing layer substantially such as described, having combined and incorporated in it a mixture of fine sand, slaked lime, and ground marble, whereby the surface of the pavement is caused to harden quickly, substantially as set forth.

5. In a street pavement or roadway consisting of a base of coarse broken stone cemented together in the manner and by the means described, an intermediate layer of smaller stones united in the manner and by the means set forth, and a surface or wearing course having incorporated therein the drying or hardening material, when constructed and combined in the manner set forth.

DAVIS W. BAILEY.

Witnesses:

FRANCIS D. BAILEY,

O. D. BARRETT.